April 20, 1965   J. C. DONAHUE   3,179,271
FARM IMPLEMENT CARRIER
Filed May 27, 1963   2 Sheets-Sheet 1

INVENTOR.
James C. Donahue
BY John A. Hamilton
Attorney.

April 20, 1965        J. C. DONAHUE        3,179,271
FARM IMPLEMENT CARRIER
Filed May 27, 1963        2 Sheets-Sheet 2
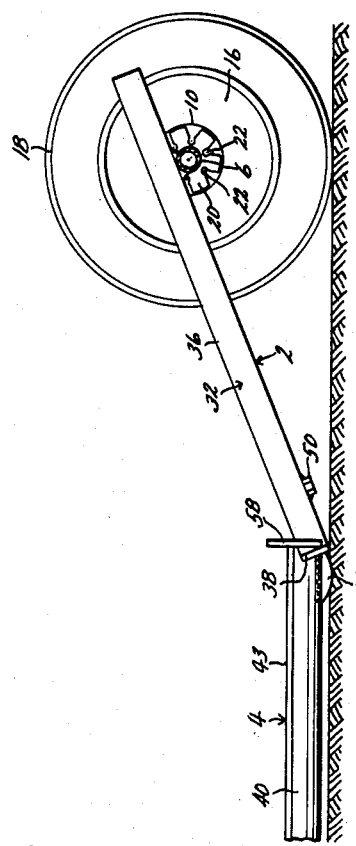
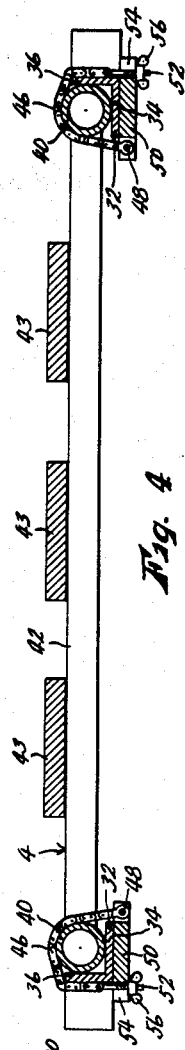
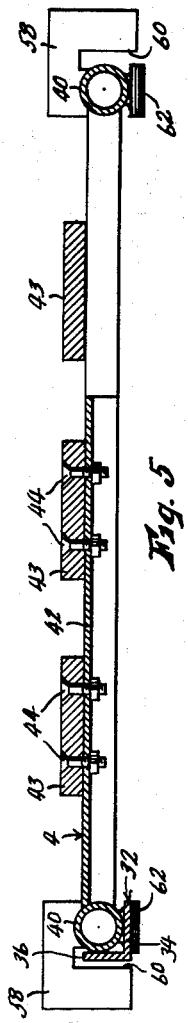
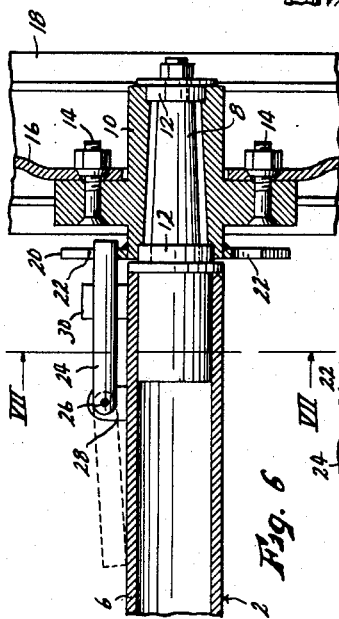
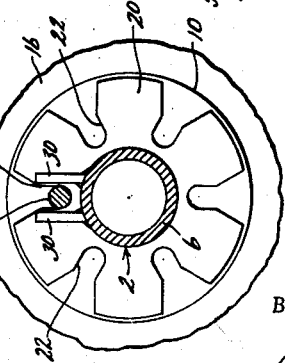
INVENTOR.
James C. Donahue
BY John A. Hamilton
Attorney.

United States Patent Office 3,179,271
Patented Apr. 20, 1965

3,179,271
FARM IMPLEMENT CARRIER
James C. Donahue, Durham, Kans.
Filed May 27, 1963, Ser. No. 283,384
7 Claims. (Cl. 214—506)

This invention relates to new and useful improvements in farm carriers, and has particular reference to a carrier intended primarily for use in transporting farm implements such as cultivators, plows, harrows, drills and the like, although as will readily appear it is adapted for general hauling of many other types of farm material such as irrigation pipe, lumber, timber, baled hay, bundled feed, etc.

The principal object of the present invention is the provision of a carrier including a wheeled bed operable to be lowered to ground level in order that farm implements may be pulled or rolled directly thereon, and then raised to provide good road clearance to permit easy transporting over rough farm roads.

Another object is the provision of a farm carrier of the character described which may be pulled by nearly any tractor, truck or other farm vehicle, and wherein the towing vehicle supplies most of the power for elevating the carrier bed from its loading position to its transport position.

Still another object is the provision of a farm carrier of the character described wherein the wheels supporting the carrier bed may be shifted forwardly and rearwardly with respect to said bed, in order to better distribute the weight of the load with respect to said wheels.

Other objects are simplicity and economy of construction, efficiency and dependability of operation, and speed and convenience of manipulation.

Figure 1:
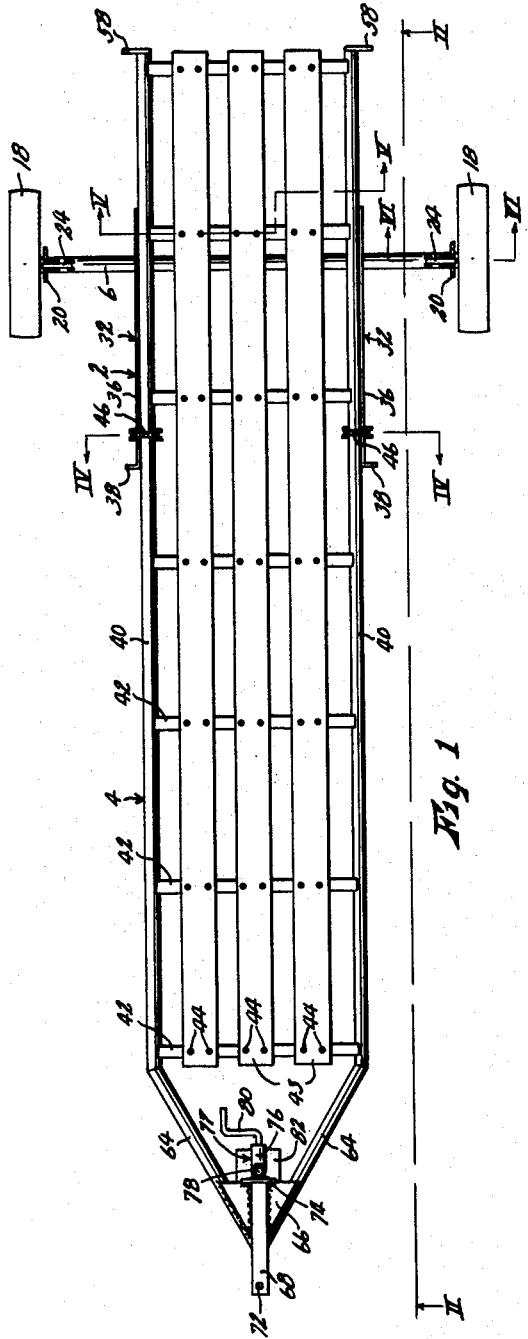
Figure 2:
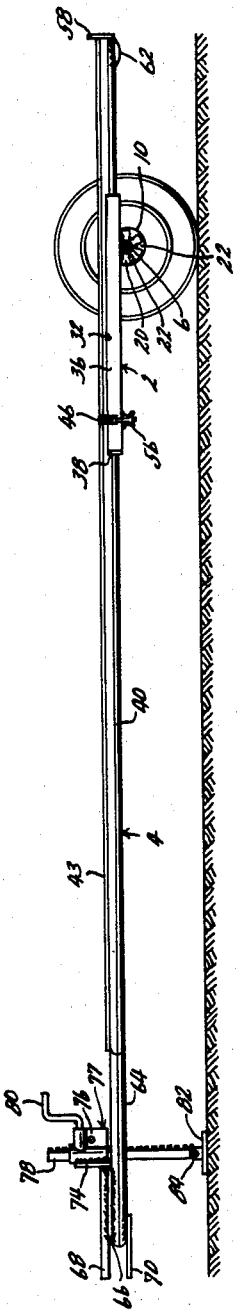

With these objects in view, as well as other objects which will appear in the course of the specification, reference will be had to the accompanying drawing, wherein:

FIG. 1 is a top plan view of a farm implement carrier embodying the present invention, with the bed in its elevated or transport position, FIG. 2 is a sectional view taken on line II—II of FIG. 1.

FIG. 3 is an enlarged fragmentary sectional view similar to FIG. 2, but showing the bed in its lowered or loading position, FIG. 4 is an enlarged sectional view taken on line IV—IV of FIG. 1, FIG. 5 is an enlarged sectional view taken on line V—V of FIG. 1, FIG. 6 is an enlarged fragmentary sectional view taken on line VI—VI of FIG. 1, and FIG. 7 is a fragmentary sectional view taken on line VII—VII of FIG. 6.

Like reference numerals apply to similar parts throughout the several views, the carrier forming the subject matter of the present invention comprising a carriage and a bed indicated respectively and generally by the numerals 2 and 4. Carriage 2 includes an axle tube 6 which extends horizontally and transversely to the line of travel of the carrier. As best shown in FIG. 6, a stub axle 8 is welded or otherwise fixed in each end of tube 6, and extends axially therefrom, having a wheel hub 10 mounted rotatably thereon by means of bearings 12. Affixed to said hub by lug bolts 14 is the central web or disc 16 of a ground-engaging wheel 18, said wheel being concentric with axle 8.

Rigidly attached to hub 10 at the inner side of the wheel, as by welding, is an index plate 20, said index plate being circular and concentric with the hub, and having a series of angularly spaced apart radial notches 22 formed in the edge thereof. A straight lock bar 24 is pivoted at one end, as at 26, between a pair of ears 28 affixed to the upper side of axle tube 6 in spaced relation from index plate 20. Said pivot is transverse to the axle tube, whereby said lock bar may be pivoted selectively either to extend toward the associated wheel 18, wherein it engages in one of notches 22 of the index plate, whereby to secure said wheel against rotation, as shown in solid lines in FIG. 6, or to extend away from the wheel and rest on the top of axle tube 6, as shown in dotted lines. These are respectively the engaged and disengaged positions of the lock bar. As the lock bar is moved to its engaged position, it enters between a pair of guide ears 30 welded to axle tube 6, in spaced relation from pivot 26, and is braced thereby against lateral displacement. The outer portion of each of notches 22 in index plate 20 is taperingly enlarged whereby to assist the lock bar in "finding" and entering said notch.

Carriage 2 also includes a slide comprising a pair of angle irons 32 welded to axle tube 6 and extending at right angles thereto. Said angles extend both forwardly and rearwardly from said axle tube, though they extend forwardly to a much greater distance than they do rearwardly. As best shown in FIGS. 4 and 5, each of said angle irons has, in cross-sectional contour, a horizontal leg 34, said horizontal legs of the angles being coplanar, and a vertical leg 36, said vertical legs being disposed at the outer or distal sides of said angles. At the extreme forward ends of said vertical legs, portions thereof are bent outwardly to form stop tabs 38, for a purpose which will presently appear.

Carrier bed 4 is essentially planar and is elongated in the direction of travel of the carrier, consisting of a pair of parallel tubular side rails 40 connected at intervals along their lengths by a series of channel-shaped cross bars 42, and having a flooring consisting of a plurality of elongated planks 43 overlying said cross bars and secured thereto by bolts 44. Side rails 40 rest respectively for longitudinal sliding movement in slide angle irons 32 of the carriage, being supported on horizontal legs 34 of said angles, and being stabilized against lateral movement by their inclusion between vertical legs 36 of said angles. Each of said side rails is releasably secured against movement in its associated slide angle iron by a clamp chain 46 which encircles said angle iron and side rail as best shown in FIG. 4. One end of said chain is secured as at 48 to one end of a bar 50 extending transversely beneath and welded or otherwise affixed to said angle iron adjacent the forward end thereof, and the chain then passes over the associated side rail 40 and has attached to the other end thereof a threaded bolt stem 52 which engages releasably in a notch 54 formed in the opposite end of bar 50. Said chain is drawn tight by a wing nut 56 threaded on said bolt stem beneath bar 50. Said bolt stem may be disengaged from notch 54 when nut 56 is loosened.

Affixed rigidly to the extreme rearward end of each side rail 40, as by welding, is a stop plate 58, said stop plate being disposed at right angles to the axis of said side rail, and extending outwardly therefrom. A notch 60 (see FIG. 5) is formed in the lower edge of said stop plate, so that when the carrier bed is slid forwardly in the carriage to such an extent that stop plates 58 move forwardly of the rearward ends of carriage slides 32, said notches 60 will pass over the vertical legs 36 of the angle irons 32 forming said slides. Welded to the lower side of each side rail 40, also at the extreme rearward end thereof, is a downwardly convex arcuately curved skid member 62, the purpose of which will presently appear.

At the forward end of carrier bed 4, the side rails 40 thereof are converged as indicated at 64, and welded to a gusset plate 66. Welded to said gusset plate is a forwardly extending draft bar 68, and a corresponding draft bar 70 is welded to the lower side of side rails 40 at their point of convergence. Said draft bars are perforated as at 72 to receive a pin therethrough, not shown, by means of which the carrier may be attached to the trailer hitch or other towing hitch of a farm truck, tractor or other suitable towing vehicle and towed therebehind. Also welded to gusset plate 66, and to a vertically upright plate 74 affixed to said gusset plate, is the frame or body member 76 of a manually operable jack 77, said jack including a post 78 which is vertically movable in body member 76 by operation of a crank 80, said post having a ground-engaging foot plate 82 pivoted at 84 to the lower end thereof. Said jack is of such standard and commonly known structure as to be well understood in the art, and the specific internal structure thereof is therefore not here shown.

The operation of the device is substantially as follows: Assuming first that the carrier is positioned as in FIGS. 1 and 2 except that the draft bars 68–70 are attached to a towing vehicle and except that the foot plate 82 of the jack is elevated to be disposed between side rails 40, the carrier bed is lowered to the ground by first engaging lock bars 24 to lock wheels 18 against rotation relative to axle tube 6, then releasing clamp chains 46, then moving the towing vehicle forwardly, whereupon the carrier bed 2 slides forwardly in angle irons 32. The arcuate skids 62 enter into said slide angles, and as said skids pass forwardly of the vertical plane of axle tube 6, the forward ends of said slide angles are lowered to the ground as shown in FIG. 3, both by their own weight, since they are overbalanced to the front, and also by the weight of the carrier bed which is then supported by said slide angles forwardly of the axle. As the bed is pulled still farther forward, skids 62 slide down the angles 32 to the forward end thereof, so that the rearward end of the carrier bed then rests substantially on the ground. The side rails 40 of the bed are prevented from pulling completely free of the slide angles by the engagement of stop plates 58 with stop tabs 38, as shown in FIG. 3. The operator then turns crank 80 to lower foot plate 82 of the jack to the ground to support the forward end of the bed, detaches the towing vehicle from the bed, then again operates the jack to lower the forward end of the bed to the ground. The entire bed then lies substantially flat on the ground, and it is quite convenient to push or pull wheeled farm implements of nearly any type onto said bed, or to load any other equipment or supplies thereon. The vertical thickness of the bed can easily be made at least as small as three inches, so that even relatively small-wheeled implements can be rolled thereon with very little trouble. The bed is uninterruptedly accessible along the entire length thereof from both sides, since wheels 18 are then disposed to the rear of the bed.

After the load is positioned and secured on the bed, the operator turns crank 80 to operate the jack to elevate the forward end of the bed, and then connects draft bars 68–70 to the towing vehicle, then again elevates jack foot plate 82 to the level of the bed. The towing vehicle is then backed to force the skids 62 at the rearward end of the bed to slide upwardly along the inclined planes formed by slide angles 32, whereby to elevate the rearward end of the bed. When the skids pass rearwardly through the vertical plane of axle tube 6, the downward pressure thereof on the rearwardly extended portions of slide angles 32 causes carriage to tilt to elevate the forward ends of said slide angles into engagement with side rails 40 of the bed. The bed may be slid still farther rearwardly in the carriage, to any extent desired, or until the axle tube 6 is centered beneath the load carried on the bed, so that the carrier will trail more smoothly when it is being towed over the roadway. When the carrier bed has been positioned as desired, clamp chains 46 are again secured and tightened, and lock bars 24 are disengaged to free wheels 18 for rotation. The carrier is then adapted to be pulled by the towing vehicle in the manner of an ordinary trailer. Clamp chains 46 of course prevent the carrier bed from shifting forwardly or rearwardly in the carriage by accident, and also prevent any possibility that the carrier bed could bounce out of slide angles 32 on rough roads or the like.

While I have shown and described a specific embodiment of my invention, it will be readily apparent that many minor changes of structure and operation could be made without departing from the spirit of the invention. For example, wheel locks 24 could be dispensed with and the wheels secured by ordinary chocks whenever it is desired to shift the bed forwardly or rearwardly in the carriage. The angle irons 32 of course form essentially a planar slide, but it could be formed in many ways. Rollers could be provided for assisting movement of the bed in the carriage, although the structure as shown has proved quite satisfactory if the slide is lubricated occasionally. Securing means other than chains 46 could be utilized, as could elevating means for the forward end of the bed other than jack 77. It is considered that these as well as other modifications are within the scope of the invention as defined by the appended claims.

What I claim as new and desire to protect by Letters Patent is:

1. A farm implement carrier comprising:
   (a) a carriage including
      (1) a horizontal transverse axle,
      (2) ground-engaging wheels supporting said axle,
      (3) means for releasably locking said ground-engaging wheels against rotation, and
      (4) a generally planar, normally horizontal, upwardly facing slide affixed to said axle, said slide being disposed above said axle, and extending both forwardly and rearwardly therefrom,
   (b) a substantially planar, elongated bed adapted to be connected at its forward end to a towing vehicle in spaced relation above the ground and having a rearward portion thereof slidably supported by said slide for longitudinal movement thereon transversely of said axle, said bed normally extending rearwardly of said axle, said bed then being supported in a generally horizontal position in spaced relation above the ground by said slide and said towing vehicle, whereby when said wheels are secured against rotation and said bed is moved forwardly on said slide by said towing vehicle to a position wherein the rearward end of said bed is disposed forwardly of said axle, the forward end of said slide is inclined downwardly to engage the ground, and whereby still further forward movement of said bed in said inclined slide lowers the rearward end of said slide to the ground, and
   (c) manually operable means carried adjacent the forward end of said bed for raising and lowering the forward end of said bed with respect to the ground when it is disconnected from said towing vehicle.

2. A farm implement carrier as recited in claim 1 with the addition of:
   (a) releaseable securing means operable to secure said bed against movement in said slide.

3. A farm implement carrier as recited in claim 1 with the addition of:
   (a) cooperating stop members carried respectively by said slide and said bed and operable by engagement therebetween to prevent said bed from being pulled free from the forward end of said slide.

4. A farm implement carrier as recited in claim 1 wherein said slide comprises a pair of parallel, spaced apart angle irons, each of said angle irons having a horizontal leg and a vertical leg in cross-sectional contour, and wherein said bed includes a pair of parallel side rails, said side rails resting respectively on the horizontal legs of said angle irons and being restrained against lateral horizontal displacement by the vertical legs of said angle irons.

5. A farm implement carrier as recited in claim 4 with the addition of:
 (a) a bar affixed to the lower face of each of said angle irons and extending transversely outwardly therefrom,
 (b) a flexible chain fixed at one end to one end of said bar and extending upwardly and over said angle iron and the bed side rail supported therein, and
 (c) means releaseably connecting the other end of said chain to the opposite end of said bar and operable to tension said chain to clamp said side rail tightly in said angle iron.

6. A farm implement carrier as recited in claim 1 wherein said wheel locking means comprises:
 (a) a circular index plate affixed concentrically to each of said wheels so as to rotate therewith relative to said axle, said index plate having a series of angularly spaced apart notches formed radially in the edge thereof, and
 (b) a lock bar pivoted to said axle on an axis transverse thereto and operable by said pivoting to be selectively engaged in any one of the notches of said index plate, whereby the associated wheel is locked against rotation relative to said axle.

7. A farm implement carrier as recited in claim 1 wherein said manually operable means for raising and lowering the forward end of said bed comprises a jack including:
 (a) a jack body affixed to said bed,
 (b) a vertical post carried for vertical movement in said jack body,
 (c) means operable to move said post in said jack body, and
 (d) a ground-engaging foot plate pivoted to the lower end of said post on a horizontal axis transverse to said bed.

References Cited by the Examiner
UNITED STATES PATENTS

| 2,531,694 | 11/50 | Larsen | 214—506 |
| 2,789,714 | 4/57 | Norris | 214—506 |
| 2,823,817 | 2/58 | Holsclaw | 214—506 |
| 2,838,191 | 6/58 | Schramm | 214—505 |

HUGO O. SCHULZ, *Primary Examiner.*
GERALD M. FORLENZA, *Examiner.*